US012631077B2

(12) United States Patent
Phan et al.

(10) Patent No.: US 12,631,077 B2
(45) Date of Patent: May 19, 2026

(54) HYBRID PHYSICS-AI METHOD FOR ACCURATE AND FAST MUD-WEIGHT WINDOW CALCULATIONS

(71) Applicant: ARAMCO SERVICES COMPANY, Houston, TX (US)

(72) Inventors: Dung T. Phan, Brookshire, TX (US); Chao Liu, Brookshire, TX (US); Younane N. Abousleiman, Norman, OK (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1063 days.

(21) Appl. No.: 17/727,330

(22) Filed: Apr. 22, 2022

(65) Prior Publication Data

US 2023/0340843 A1 Oct. 26, 2023

(51) Int. Cl.
E21B 21/08 (2006.01)
G06N 3/08 (2023.01)

(52) U.S. Cl.
CPC .......... E21B 21/08 (2013.01); *E21B 2200/20* (2020.05); *E21B 2200/22* (2020.05); *G06N 3/08* (2013.01)

(58) Field of Classification Search
CPC .. E21B 21/08; E21B 2200/20; E21B 2200/22; G06N 3/08

(Continued)

(56) References Cited

U.S. PATENT DOCUMENTS 5,205,164 A * 4/1993 Steiger .................. E21B 49/006
                                                           702/9
5,398,215 A * 3/1995 Sinha ....................... G01V 1/44
                                                           367/27

(Continued)

FOREIGN PATENT DOCUMENTS

SA            14620 B1    1/2021
SA            15239 B1    10/2021
WO      2021/011523 A1    1/2021

OTHER PUBLICATIONS

Liu et al. (Multiporosity/Multipermeability Inclined-Wellbore Solutions With Mudcake Effects, 2018, Society of Petroleum Engineers, pp. 1723-1747) (Year: 2018).*

(Continued)

*Primary Examiner* — Iftekhar A Khan
(74) *Attorney, Agent, or Firm* — Osha Bergman Watanabe & Burton LLP

(57) ABSTRACT

A system and method for determining a mud-weight window is disclosed. The method includes determining, for each of a plurality of borehole-formation training models, a fracture mud weight using a first physics-based method and a collapse mud weight using a second physics-based method, and training, using the plurality of borehole-formation training models, an artificial intelligence (AI) network to predict the fracture and collapse mud weights for a borehole formation model. The method further includes determining, using the trained AI network, an AI fracture and an AI collapse mud weight from an observed borehole-formation model, and a search window surrounding each AI mud weight. The method further includes predicting a final fracture mud weight within the fracture search window using the first physics-based method and a final collapse mud weight within the collapse search window using the second physics- (Continued)

based method, and determining the mud-weight window bounded by the two final mud weights.

17 Claims, 8 Drawing Sheets

(58) Field of Classification Search
USPC .......................................................... 703/10
See application file for complete search history.

(56) References Cited

U.S. PATENT DOCUMENTS

| | | | | |
|---|---|---|---|---|
| 6,179,069 B1 * | 1/2001 | Zheng | E21B 21/06 | |
| | | | | 166/308.1 |
| 9,646,115 B2 * | 5/2017 | Frydman | E21B 47/10 | |
| 9,803,475 B2 * | 10/2017 | Shahri | E21B 21/003 | |
| 10,577,908 B2 * | 3/2020 | Kisra | E21B 47/024 | |
| 11,091,989 B1 * | 8/2021 | De Oliveira | E21B 49/005 | |
| 11,486,247 B2 * | 11/2022 | Bermudez Martinez | | |
| | | | E21B 47/06 | |
| 11,549,361 B2 * | 1/2023 | Han | E21B 49/006 | |
| 11,578,564 B2 * | 2/2023 | Liu | G01V 1/282 | |
| 11,885,205 B1 * | 1/2024 | Liu | E21B 43/26 | |
| 11,966,845 B1 * | 4/2024 | Dyngosz | G06N 3/045 | |
| 2002/0010548 A1 * | 1/2002 | Tare | E21B 21/08 | |
| | | | | 702/9 |
| 2003/0212495 A1 * | 11/2003 | Mese | E21B 21/08 | |
| | | | | 702/9 |
| 2006/0149478 A1 * | 7/2006 | Calhoun | E21B 45/00 | |
| | | | | 702/9 |
| 2007/0143020 A1 * | 6/2007 | Bradford | G01V 1/40 | |
| | | | | 702/6 |
| 2013/0275099 A1 * | 10/2013 | Frydman | E21B 47/10 | |
| | | | | 703/2 |
| 2014/0246244 A1 * | 9/2014 | Shen | E21B 21/08 | |
| | | | | 175/57 |
| 2015/0055438 A1 * | 2/2015 | Yan | G01V 1/282 | |
| | | | | 367/73 |
| 2015/0292323 A1 * | 10/2015 | Shahri | E21B 49/003 | |
| | | | | 702/9 |
| 2016/0053604 A1 * | 2/2016 | Abbassian | E21B 44/00 | |
| | | | | 702/6 |
| 2016/0222741 A1 * | 8/2016 | Lovorn | E21B 34/00 | |
| 2017/0058668 A1 * | 3/2017 | Paul | E21B 49/00 | |
| 2019/0264559 A1 * | 8/2019 | Han | E21B 49/006 | |
| 2019/0368346 A1 * | 12/2019 | Liu | E21B 49/005 | |
| 2020/0333505 A1 * | 10/2020 | Yan | G06F 30/27 | |
| 2020/0362695 A1 * | 11/2020 | Al-Rubaii | E21B 49/005 | |
| 2021/0017857 A1 * | 1/2021 | Khan | E21B 49/003 | |
| 2021/0277762 A1 * | 9/2021 | Liu | E21B 47/06 | |
| 2023/0039147 A1 * | 2/2023 | Gutarov | E21B 47/007 | |
| 2023/0222773 A1 * | 7/2023 | Zarian | G01V 20/00 | |
| | | | | 382/109 |
| 2023/0228181 A1 * | 7/2023 | Liu | E21B 49/00 | |
| | | | | 175/38 |
| 2023/0281257 A1 * | 9/2023 | Chembolu | G06F 16/9532 | |
| 2023/0288592 A1 * | 9/2023 | Colombo | G01V 20/00 | |

OTHER PUBLICATIONS

Phan et al. (Application of Artificial Intelligence to Predict Time-Dependent Safe MudWeight Windows for Inclined Wellbores, 2020, International Petroleum Technology Conference, pp. 1-12) (Year: 2020).*

Ahmed et al. (Determination of Safe Operating Mud Weight Window from Well Logging Data Using Machine Learning Algorithms, 2020, Offshore Technology Conference, pp. 1-15) (Year: 2020).*

Aslannezhad et al. (Determination of a safe mud window and analysis of wellbore stability to minimize drilling challenges and non-productive time, J Petrol Explor Prod Technol (2016) 6:493-503) (Year: 2016).*

Hayavi et al. (Determination of safe mud pressure window for different well trajectories and stress regimes during drilling operations, Geomechanics for Energy and the Environment 12 (2017) 14-20) (Year: 2017).*

Abousleiman, Y. et al., "Poroelastic Solutions in Transversely Isotropic Media for Wellbore and Cylinder"; International Journal of Solids and Structures; vol. 35, Issues 34-35; pp. 4905-4929; Dec. 1998 (25 pages).

Abousleiman, Y. et al., "Time-Dependent Wellbore (In) Stability Predictions: Theory and Case Study"; Proceedings of the 2000 IADC/SPE Asia Pacific Drilling Technology; Paper No. SPE-62796-MS; pp. 1-8; Sep. 11, 2000 (8 pages).

Abousleiman, Younane et al., "Poromechanics Response of Inclined Wellbore Geometry in Fractured Porous Media"; Journal of Engineering Mechanics; vol. 131, Issue 11; pp. 1170-1183; Nov. 2005 (14 pages).

Cui, L. et al., "Poroelastic Solution for an Inclined Borehole"; Journal of Applied Mechanics; vol. 64, Issue 1; pp. 32-38; Mar. 1997 (7 pages).

Ekbote, Shailesh et al., "Porochemothermoelastic Solution for an Inclined Borehole in a Transversely Isotropic Formation"; Journal of Engineering Mechanics; vol. 131, Issue 5; pp. 522-533; May 2005 (12 pages).

Ekbote, Shailesh et al., "Porochemoelastic Solution for an Inclined Borehole in a Transversely Isotropic Formation"; Journal of Engineering Mechanics; vol. 132, Issue 7; pp. 754-763; Jul. 2006 (10 pages).

Liu, Chao et al., "Multiporosity/Multipermeability Inclined-Wellbore Solutions With Mudcake Effects"; SPE Journal; vol. 23, Issue 5, Paper No. SPE-191135-PA; pp. 1723-1747; Oct. 2018 (25 pages).

Liu, Chao et al., "Theory and Analytical Solutions to Coupled Processes of Transport and Deformation in Dual-Porosity Dual-Permeability Poro-Chemo-Electro-Elastic Media"; Journal of Applied Mechanics; vol. 85, Issue 11, Article No. 111006; pp. 111006-1-111006-13; Nov. 2018 (13 pages).

Nguyen, Vinh X. et al., "Incorporating electrokinetic effects in the porochemoelastic inclined wellbore formulation and solution"; Anais da Academia Brasileira de Ciências; vol. 82, Issue 1; pp. 195-222; Mar. 2010 (28 pages).

Phan, Dung T. et al., "Application of Artificial Intelligence to Predict Time-Dependent Safe Mud Weight Windows for Inclined Wellbores"; Proceedings of the International Petroleum Technology Conference; Paper No. IPTC-19900-MS; pp. 1-12; Jan. 13, 2020 (12 pages).

"Stress around a shaft or level excavated in ground with a three-dimensional stress state : Yoshio Hiramatsu and Yukitoshi Oka. Memoirs of the Faculty of Engineering, Kyoto Univ., 24, 56-76 (1962)"; International Journal of Rock Mechanics and Mining Sciences & Geomechanics Abstracts; vol. 1, Issue 2; pp. 309-310; Mar. 1964 (2 pages).

Zahiri, Javad et al., "Determination of safe mud weight window based on well logging data using artificial intelligence"; Geosystem Engineering; vol. 22, Issue 4; pp. 193-205; Aug. 20, 2018 (14 pages).

Fjær, E. et al., "Petroleum Related Rock Mechanics 2nd Edition"; Elsevier; Developments in Petroleum Science; vol. 53; Chapter 2: Failure mechanics; pp. 55-102; 2008 (48 pages).

Fjær, E. et al., "Petroleum Related Rock Mechanics 2nd Edition"; Elsevier; Developments in Petroleum Science; vol. 53; Chapter 4: Stresses around boreholes. Borehole failure criteria; pp. 135-174; 2008 (40 pages).

Office Action issued in corresponding Saudi Arabian Application No. 123446965; dated Mar. 23, 2025 (20 pages).

* cited by examiner

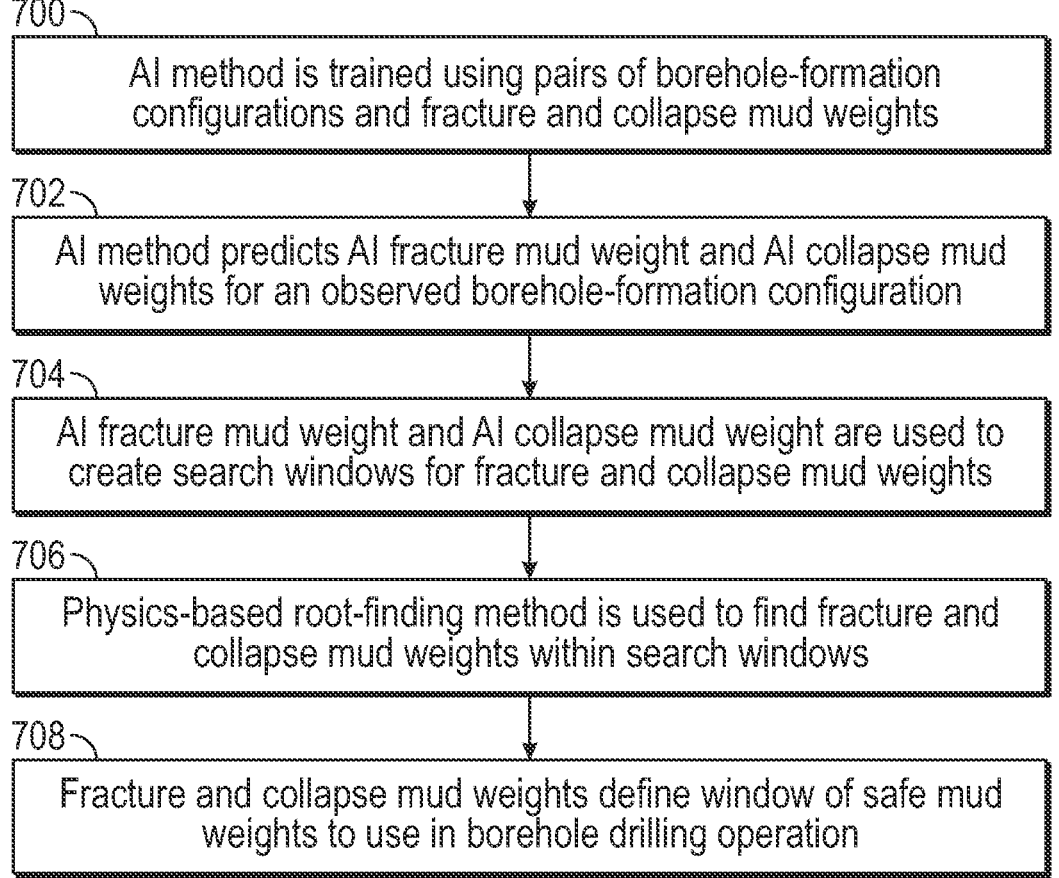

700 — AI method is trained using pairs of borehole-formation configurations and fracture and collapse mud weights 702 — AI method predicts AI fracture mud weight and AI collapse mud weights for an observed borehole-formation configuration 704 — AI fracture mud weight and AI collapse mud weight are used to create search windows for fracture and collapse mud weights 706 — Physics-based root-finding method is used to find fracture and collapse mud weights within search windows 708 — Fracture and collapse mud weights define window of safe mud weights to use in borehole drilling operation

FIG. 7

HYBRID PHYSICS-AI METHOD FOR ACCURATE AND FAST MUD-WEIGHT WINDOW CALCULATIONS

BACKGROUND

Drilling fluid, also known as drilling mud, lubricates and cools a drill bit when drilling a borehole into the earth while also bringing cuttings of rocks to the surface. It is also a crucial factor for preventing borehole failure. The weight of the mud is typically measured in pounds per gallon (ppg). A mud weight that is too low can fail to sustain the borehole, leading to the casing and walls of the borehole collapsing. A mud weight that is too large can generate tensile stress around the borehole, resulting in borehole fracturing and mud loss. Usually, there is a safe drilling mud-weight window in which the lower bound is the critical collapse mud weight and the upper bound is the critical fracturing mud weight. A mud weight selected from within this window can prevent both borehole collapse and fracturing. Calculation of the mud-weight window is an essential part of drilling operations.

Physics-based models may be used to calculate the mud-weight window while taking into account, without limitation, the borehole trajectory, time-varying in situ stresses, pore pressure, fluid and rock properties, as well as potentially coupled thermal, chemoelectrical effects. Due to the complexity of these physics-based models and their solutions, the calculation may be time-consuming.

Artificial Intelligence (AI) solutions have also been developed to calculate a mud-weight window and shown to be three orders of magnitude faster than the physics-based solutions. However, the AI solutions cannot guarantee the accuracies of the mud-weight windows for all input data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining a mud-weight window. The method includes determining, using a computer processor, for each of a plurality of borehole-formation training models, a fracture mud weight using a first physics-based method and a collapse mud weight using a second physics-based method. The method further includes training, using the computer processor and the plurality of borehole-formation training models, an artificial intelligence (AI) network to predict the fracture mud weight and the collapse mud weight for a borehole-formation model. The method also includes further determining, using the computer processor and the trained AI network, an AI fracture mud weight and an AI collapse mud weight from an observed borehole-formation model, a fracture search window surrounding the AI fracture mud weight, and a collapse search window surrounding the AI collapse mud weight. The method still further includes predicting, using the computer processor, a final fracture mud weight within the fracture search window using the first physics-based method and a final collapse mud weight within the collapse search window using the second physics-based method. The method also includes determining the mud-weight window bounded by the final fracture mud weight and the final collapse mud weight.

In general, in one aspect, embodiments relate to a non-transitory computer readable medium storing instructions executable by a computer processor. The instructions include functionality for determining, for each of a plurality of borehole-formation training models, a fracture mud weight using a first physics-based method, a collapse mud weight using a second physics-based method, and using the plurality of borehole-formation training models for training an AI network to predict the fracture mud weight and the collapse mud weight for a borehole-formation model. The instructions also include functionality for determining, using the trained AI network, an AI fracture mud weight, an AI collapse mud weight from an observed borehole-formation model, and determining a fracture search window surrounding the AI fracture mud weight and a collapse search window surrounding the AI collapse mud weight. The instructions also include functionality for predicting a final fracture mud weight within the fracture search window using the first physics-based method and a final collapse mud weight within the collapse search window using the second physics-based method. The instructions also include functionality for determining the mud-weight window bounded by the final fracture mud weight and the final collapse mud weight.

In general, in one aspect, embodiments relate to a system including a computer processor and a drilling system. The computer processor is configured to determine, for each of a plurality of borehole-formation training models, a fracture mud weight using a first physics-based method and a collapse mud weight using a second physics-based method. The computer processor is also configured to train, using the plurality of borehole-formation training models, an AI network to predict the fracture mud weight, the collapse mud weight for a borehole-formation model, and to determine, using the computer processor and the trained AI network, an AI fracture mud weight and an AI collapse mud weight from an observed borehole-formation model. The computer processor is further configured to determine a fracture search window surrounding the AI fracture mud weight, a collapse search window surrounding the AI collapse mud weight, and predict a final fracture mud weight within the fracture search window using the first physics-based method and a final collapse mud weight within the collapse search window using the second physics-based method. The computer processor is still further configured to determine the mud-weight window bounded by the final fracture mud weight and the final collapse mud weight. The drilling system is configured to mix a mud with a mud weight within the mud-weight window by adding an amount of solid material with an amount of fluid and to drill a borehole while pumping the mud through an interior channel of a drillstring and through at least one nozzle of a drill bit.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 7 shows a flowchart for the method of producing a window of mud weights that can be used in a borehole drilling operation.

DETAILED DESCRIPTION

Figure 1:
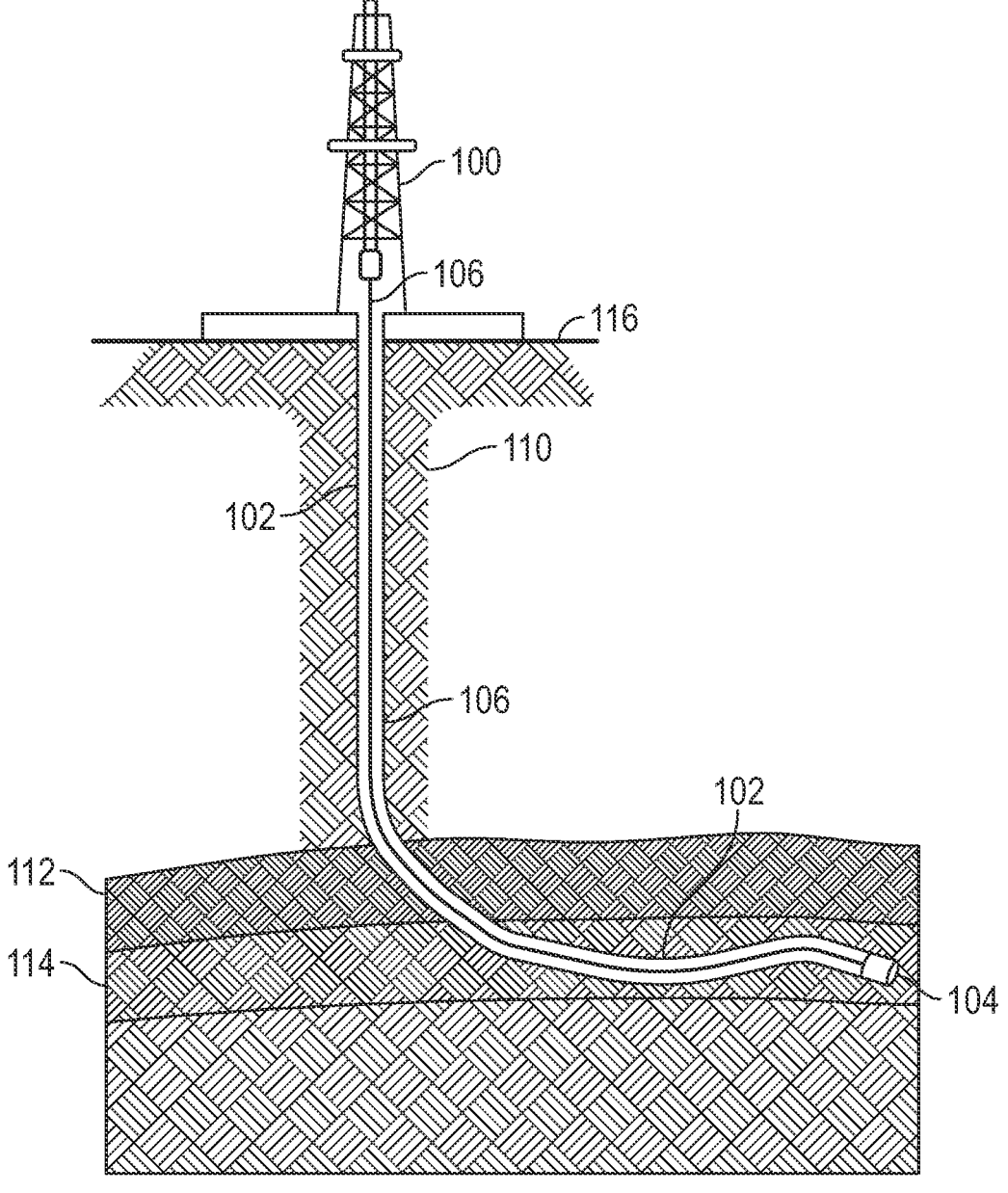
FIG. 1 shows a drilling system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a mud-weight window" includes reference to one or more of such windows.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

A hybrid physics-AI method is presented that allows for the fast and accurate calculation of the mud-weight window. The hybrid method combines the speed of AI methods and the accuracy of physics-based methods. The calculated mud-weight window is guaranteed to be the same as the one computed by the purely physics-based model while the CPU time is significantly reduced.

FIG. 1 illustrates systems in accordance with one or more embodiments. Specifically, FIG. 1 shows a well (102) that may be drilled by a drill bit (104) attached by a drillstring (106) to a drill rig (100) located on the surface of the earth (116). The "borehole" corresponds to the uncased portion of the well (102). The "borehole trajectory" is the path in three-dimensional space that the well is drilled through the subsurface. The borehole of the well may traverse a plurality of overburden layers (110) and one or more cap-rock layers (112) to a hydrocarbon reservoir (114). The curved well path of the drillstring (106) may be planned based, at least in part, on a seismic image or other remote sensing data.

"Drilling mud" refers to a fluid placed in the borehole during the process of drilling. Drilling mud serves many purposes, including lubricating and cooling the drill bit used to make the borehole, entraining rock fragments and carrying them to the surface, and through the mud pressure applied to the borehole walls preventing blow-outs or collapses of the borehole. "Mud weight" is a measure of the density of the drilling mud, e.g., measured in pounds per gallon (ppg). Drilling mud is created by mixing fluid with solid material according to a desired weight. The "fracture mud weight" (206) is the mud weight at, or above which tensile fractures may form in the borehole walls allowing fluid loss into rock formations. The "collapse mud weight" (306) is the value of mud weight at, or below, which shear fractures or breakouts may occur. The "mud-weight window" is a range of mud weights bounded at the lower end by the collapse mud weight (306) and the fracture mud weight (206) at the upper end.

"In situ stresses" are the components of the mechanical stress field present in the formation surrounding the borehole. The in situ stresses may be altered by the presence of the borehole, thus in situ stresses before the borehole is drilled, or far from the borehole, may be different from in situ stress close to the borehole.

"Pore pressure" is the state of pressure of fluid in the pore spaces within rock. Typically pore pressure increases with depth below the surface although the increase may not be linearly related to depth or even monotonic. Pore pressure may affect the mechanical response of the rock to the in situ stresses and the presence of the borehole.

"Physics-based methods" refers to computational methods using equations derived from the laws of physics that describe the physical state of the rocks in the subsurface. Without limitation, these equations may model mechanical, thermal, chemical, electrical, and other physical effects.

"Physics-based fracturing computations" refer to mathematical calculations using physics-based methods to determine when the drilling mud will cause hydraulic fractures and rupture the surrounding rock formations. "Physics-based collapse computations" refer to mathematical models using physics-based methods that calculate when the drilling mud will allow shear failures or breakouts.

"Root finding" refers to evaluating a scalar function of one independent parameter and attempting to find where the scalar function equals a predetermined value, typically zero, known as the "root" of that function. There are many methods familiar to a person of ordinary skill in the art for updating the independent parameter to find the root, e.g., the bisection method, the golden section method. The method selected for any embodiment is not intended to limit the scope of the invention.

A "search window" may refer to a range of values of a parameter within which a method searches for the root of a scalar equation. In accordance with one or more embodiments, a search window may refer to a range of mud weights.

Figure 2:
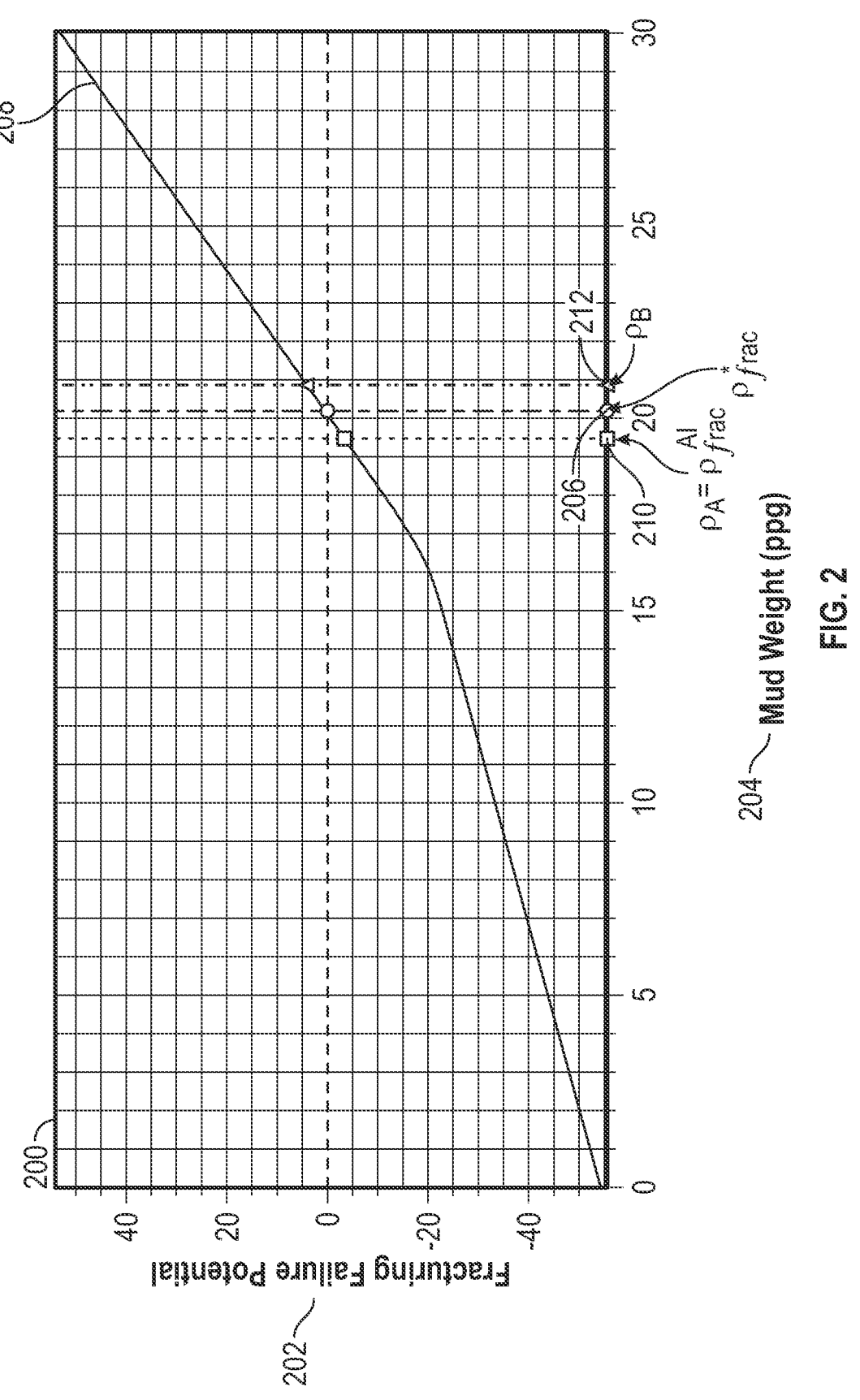
FIG. 2 shows the fracturing failure potential vs. mud weight curve.

FIG. 2 illustrates the relationship (200) between fracture failure potential, indicated on the vertical axis (202), and mud weight, indicated on the horizontal axis (204), calculated using physics-based fracturing computations. The mud weight at which the fracture failure potential has a zero value (206) is denoted $\rho_{frac}$*, and may be called the "fracture mud weight". Fracture mud weight is the value of mud weight at which fracture failure of the borehole wall is predicted to occur. The fracture mud weight value is the root of the functional relationship between fracture failure potential and mud weight (208).

$$\rho_{frac}^{AI}$$

(210) is the root value of fracture mud weight predicted by an AI method.

AI methods may refer to computational methods that mimic the human ability to reason. They may take a training data set of inputs and outputs and learn an approximate but computationally fast mapping between the inputs and outputs. AI methods may include, without limitation, Bayesian networks, adaptive neuro-fuzzy inference system (ANFIS), kernel methods (e.g., support vector machine), tree-based methods (e.g., random forest), other neural network methods (e.g., recurrent neural network, convolutional neural network), as well as any other method familiar to a person of ordinary skill in the art without departing from the scope of the invention. "Hybrid AI/physics-based methods" refers to computational methods that combine some part of both physics-based methods in combination with AI methods.

Figure 3:
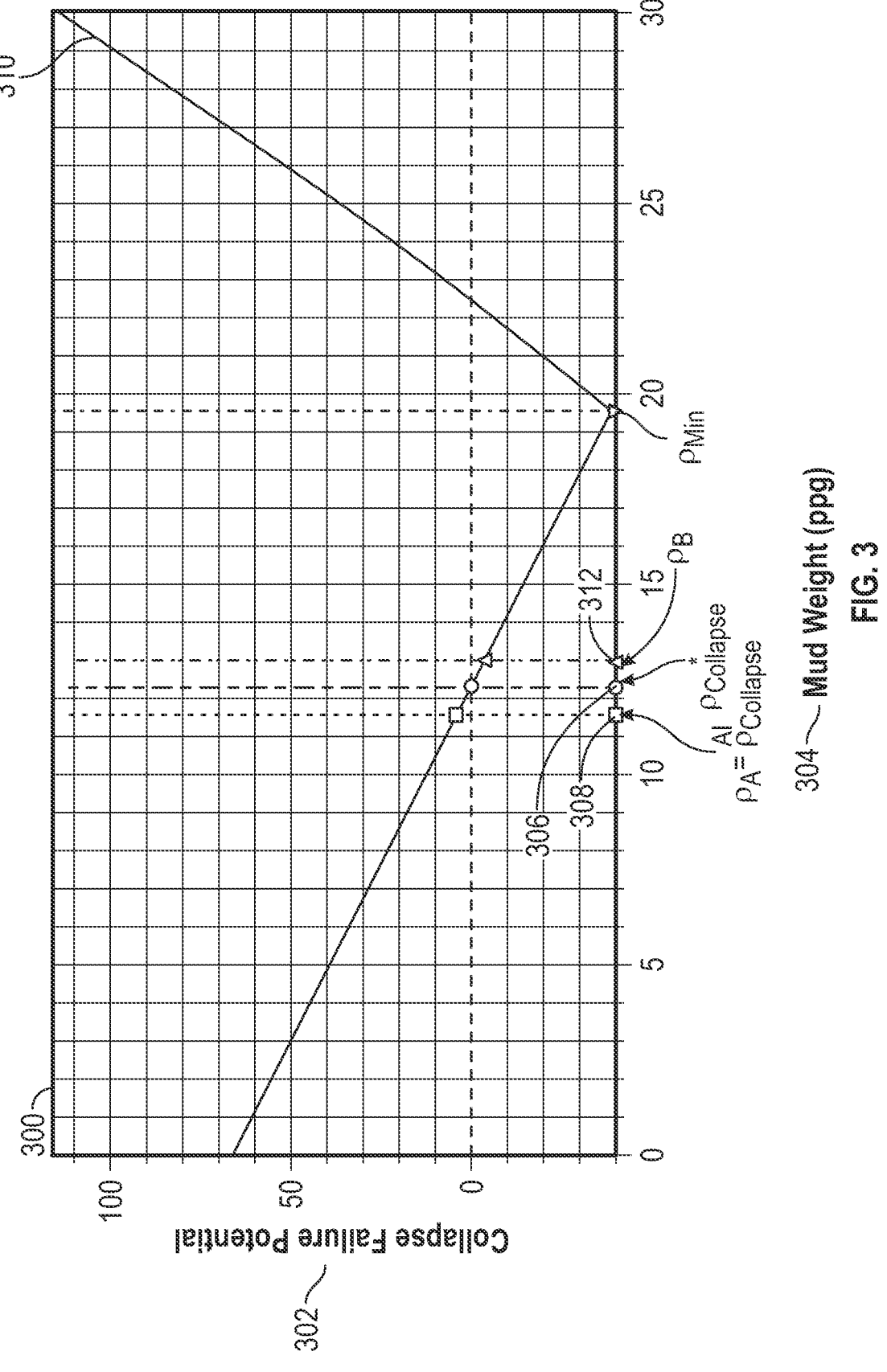
FIG. 3 shows the collapse failure potential vs. mud weight curve.

FIG. 3 illustrates the relationship (300) between collapse failure potential, indicated on the vertical axis (302), and mud weight, indicated on the horizontal axis (304), calculated using physics-based collapse computations. The lower of the two mud weight values at which the collapse failure potential has a zero value is denoted $$\rho_{collapse}^*,$$

and may be called the "collapse mud weight" (306). Collapse mud weight is the value of mud weight at which collapse failure of the borehole wall is predicted to occur. The collapse mud weight value is the root of the functional relationship between collapse failure potential and mud weight (310).

Figure 4:
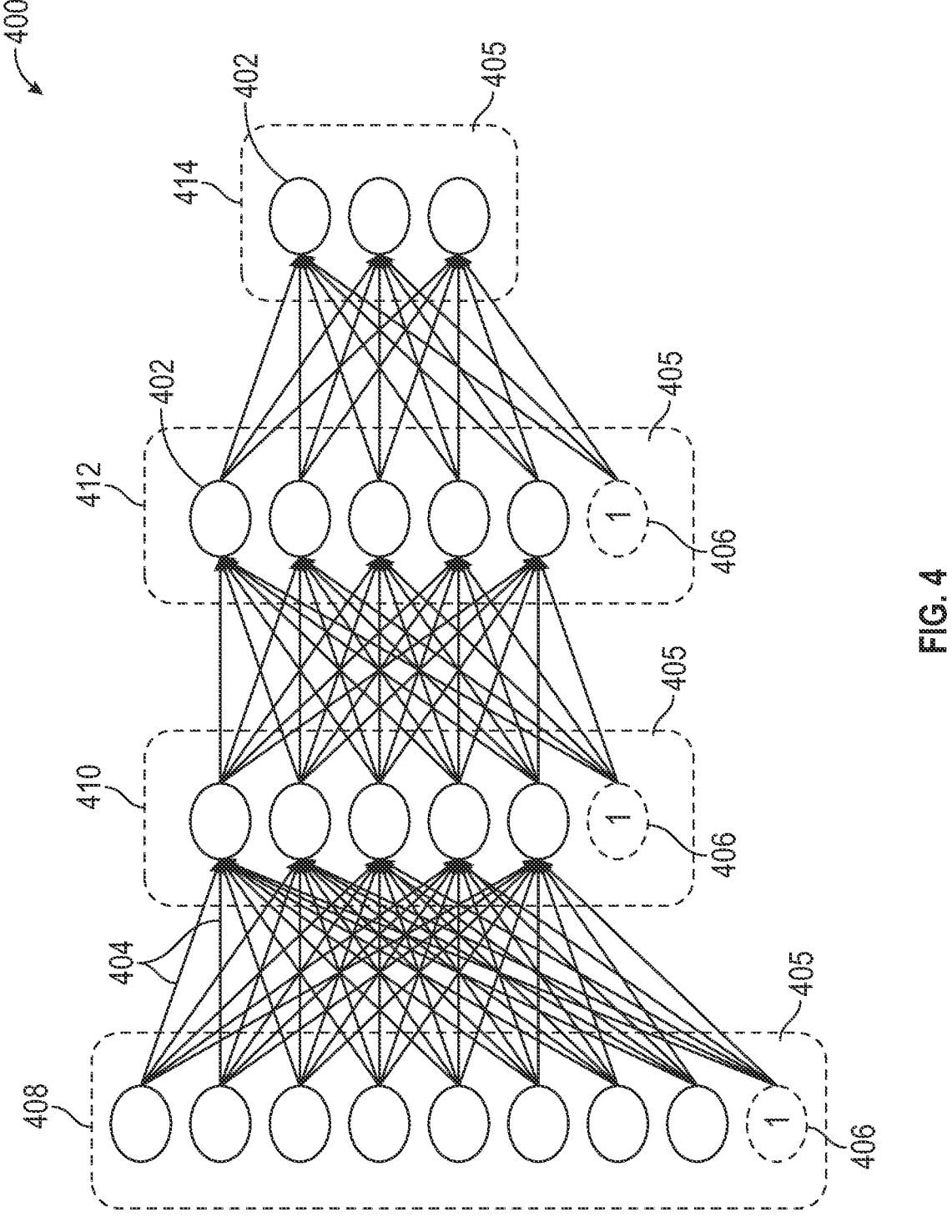
FIG. 4 shows an artificial neural network in accordance with one or more embodiments.

FIG. 4 shows a neural network, a common AI method for prediction/inference. At a high level, a neural network (400) may be graphically depicted as comprising nodes (402), where here any circle represents a node, and edges (404), shown here as directed lines. The nodes (402) may be grouped to form layers (405). FIG. 4 displays four layers (408, 410, 412, 414) of nodes (402) where the nodes (402) are grouped into columns, however, the grouping need not be as shown in FIG. 4. The edges (404) connect the nodes (402). Edges (404) may connect, or not connect, to any node(s) (402) regardless of which layer (405) the node(s) (402) is in. That is, the nodes (402) may be sparsely and residually connected. A neural network (400) will have at least two layers (405), where the first layer (408) is considered the "input layer" and the last layer (414) is the "output layer". Any intermediate layer (410, 412) is usually described as a "hidden layer". A neural network (400) may have zero or more hidden layers (410, 412) and a neural network (400) with at least one hidden layer (410, 412) may be described as a "deep" neural network or as a "deep learning method". In general, a neural network (400) may have more than one node (402) in the output layer (414). In this case the neural network (400) may be referred to as a "multi-target" or "multi-output" network.

Nodes (402) and edges (404) carry additional associations. Namely, every edge is associated with a numerical value. The edge numerical values, or even the edges (404) themselves, are often referred to as "weights" or "parameters". While training a neural network (400), numerical values are assigned to each edge (404). Additionally, every node (402) is associated with a numerical variable and an activation function. Activation functions are not limited to any functional class, but traditionally follow the form:

$$A=f(\Sigma_{i\in(incoming)}[(node\ value)_i(edge\ value)_i]), \quad \text{Equation (1)}$$

where i is an index that spans the set of "incoming" nodes (402) and edges (404) and $f$ is a user-defined function. Incoming nodes (402) are those that, when viewed as a graph (as in FIG. 4), have directed arrows that point to the node (402) where the numerical value is being computed. Some functions for $f$ may include the linear function $f(x)=x$, sigmoid function $$f(x) = \frac{1}{1+e^{-x}},$$

and rectified linear unit function $f(x)=max(0, x)$, however, many additional functions are commonly employed. Every node (402) in a neural network (400) may have a different associated activation function. Often, as a shorthand, activation functions are described by the function $f$ by which it is composed. That is, an activation function composed of a linear function $f$ may simply be referred to as a linear activation function without undue ambiguity.

When the neural network (400) receives an input, the input is propagated through the network according to the activation functions and incoming node (402) values and edge (404) values to compute a value for each node (402). That is, the numerical value for each node (402) may change for each received input. Occasionally, nodes (402) are assigned fixed numerical values, such as the value of 1, that are not affected by the input or altered according to edge (404) values and activation functions. Fixed nodes (402) are often referred to as "biases" or "bias nodes" (406), displayed in FIG. 4 with a dashed circle.

In some implementations, the neural network (400) may contain specialized layers (405), such as a normalization layer, or additional connection procedures, like concatenation. One skilled in the art will appreciate that these alterations do not exceed the scope of this disclosure.

As noted, the training procedure for the neural network (400) comprises assigning values to the edges (404). To begin training, the edges (404) are assigned initial values. These values may be assigned randomly, assigned according to a prescribed distribution, assigned manually, or by some other assignment mechanism. Once edge (404) values have been initialized, the neural network (400) may act as a function, such that it may receive inputs and produce an output. As such, at least one input is propagated through the neural network (400) to produce an output. Recall, that a given data set will be composed of inputs and associated target(s), where the target(s) represent the "ground truth", or the otherwise desired output. The neural network (400) output is compared to the associated input data target(s). The comparison of the neural network (400) output to the target(s) is typically performed by a so-called "loss function"; although other names for this comparison function such as "error function" and "cost function" are commonly employed. Many types of loss functions are available, such as the mean-squared-error function, however, the general characteristic of a loss function is that the loss function provides a numerical evaluation of the similarity between the neural network (400) output and the associated target(s). The loss function may also be constructed to impose additional constraints on the values assumed by the edges (404), for example, by adding a penalty term, which may be physics-based, or a regularization term. Generally, the goal of a training procedure is to alter the edge (404) values to promote similarity between the neural network (400) output and associated target(s) over the data set. Thus, the loss function is used to guide changes made to the edge (404) values, typically through a process called "backpropagation".

Figure 5:
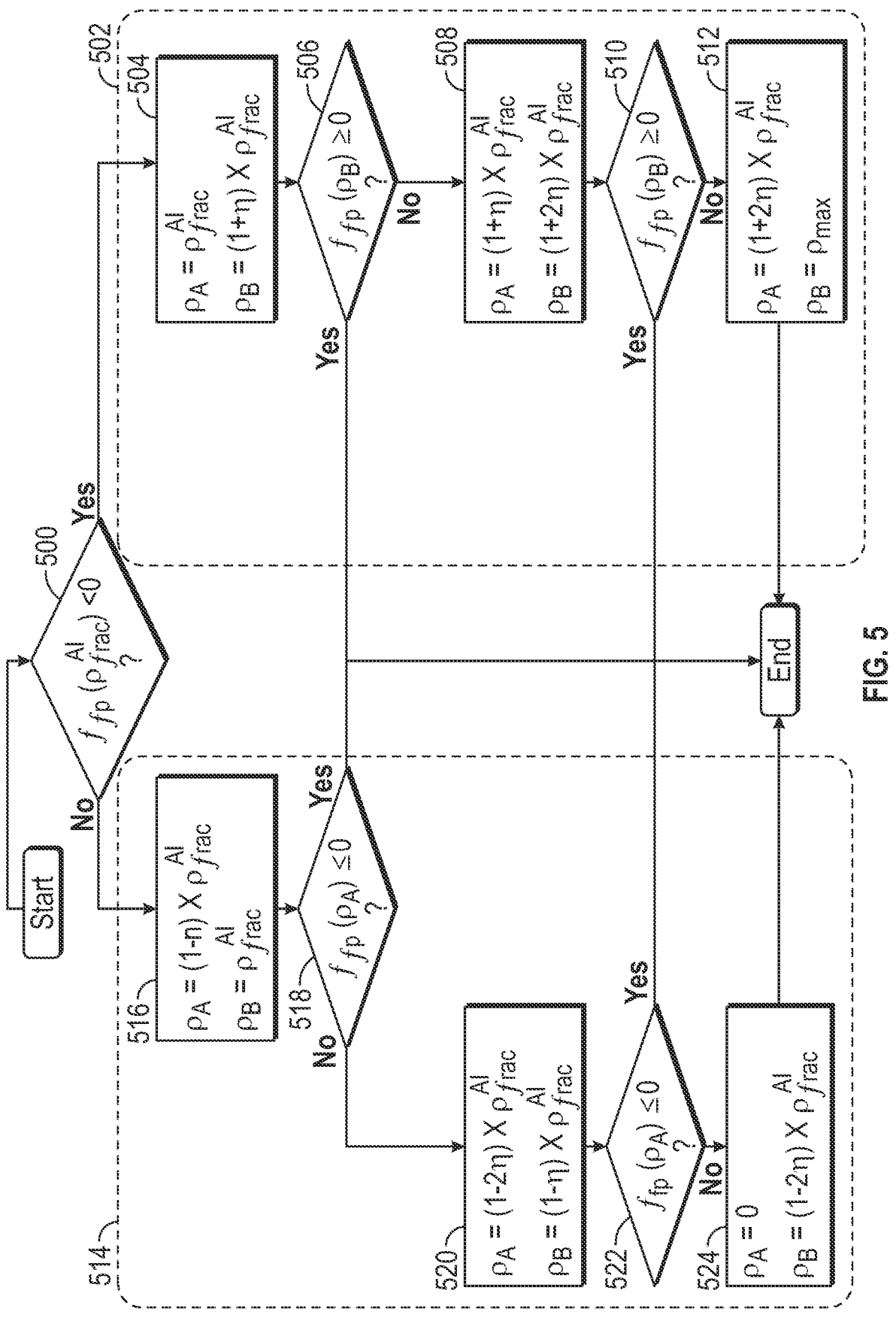
FIG. 5 shows a flowchart for defining a search window for the fracturing mud weight, starting with the AI-predicted value.

In accordance with one or more embodiments, FIG. 5 shows a flowchart to determine a fracture mud weight search window around the physics-based fracture mud weight, $$\rho^*_{frac}$$

In situ stresses, physical and mechanical properties of subsurface rocks, and borehole geometry are required for physics-based fracture calculations and are determined from the drilling operation or laboratory experiments prior to the first step in this flowchart.

In Step 500, in accordance with one or more embodiments, an AI-predicted fracture mud weight, $$\rho^{AI}_{frac},$$

may be determined, together with a corresponding physics-predicted fracture failure potential $$f_{fp}\left(\rho^{AI}_{frac}\right)$$

for the AI-predicted fracture mud weight $$\rho^{AI}_{frac}.$$

Further, in Step 500 the fracture failure potential, $$f_{fp}\left(\rho^{AI}_{frac}\right),$$

is compared to zero and the workflow bifurcates based on whether the fracture failure potential is positive or negative. Physics-based theory predicts a monotonically increasing curve (208) for fracturing failure potential, $f_{fp}$, versus mud weight, $\rho$. Therefore, if $$f_{fp}\left(\rho^{AI}_{frac}\right)$$

is less than zero (210, 500), then the value of $\rho$ for which the fracturing failure potential is zero must be greater than $$\rho^{AI}_{frac}.$$

In this case, the workflow follows the right branch (502) of FIG. 5, beginning with Step 504. Conversely, if $$f_{fp}\left(\rho^{AI}_{frac}\right)$$

is greater than or equal to zero, the workflow follows the left branch (514) of FIG. 5, starting with Step 516.

Beginning with the left branch (514) at Step 516, in accordance with one or more embodiments, a first bound of a fracture mud weight search window, $\rho_B$, may be defined, where $$\rho_B = \rho^{AI}_{frac}.$$

Further, a second bound of the fracture mud weight search window, $$\rho_A = (1 - \eta)\rho^{AI}_{frac},$$

may be defined. In some embodiments, $\eta$ is a factor that may be set to 0.1, signifying the fracture mud weight search window extends from 90% to 100% of the predicted AI fracture mud weight, $$\rho^{AI}_{frac}.$$

In other embodiments, $\eta$ may be set to a different value. If the value of $f_{fp}(\rho_A)$ is less than or equal to zero, we know that a root lies in the window and the process terminates (518). If not, the right end of the window is now set to $$\rho_B = (1 - \eta) \times \rho^{AI}_{frac}$$

and the left end is set to $$\rho_A = (1 - 2\eta) \times \rho_{frac}^{AI}(520). \ f_{fp}(\rho_A)$$

is then evaluated. If it is less than or equal to zero, a root must lie in the window and the process terminates (522). If not, the right end of the window is set to $$\rho_B = (1 - 2\eta) \times \rho_{frac}^{AI}$$

and the left end of the window is set to $\rho_A=0$ (524). The root of the curve must lie in this window, so the process terminates.

Returning to the right branch (502) in the case of $$f_{fp}\left(\rho_{frac}^{AI}\right)$$

less than zero, the bracket is initially set between $$\rho_A = \rho_{frac}^{AI}$$

on the left and the value $$\rho_B = (1 + \eta) \times \rho_{frac}^{AI}$$

on the right (210, 212, 504). In the next box on the right branch of the flowchart, the fracture failure potential of the new end point of the window, $\rho_B$, is evaluated. If $f_{fp}(\rho_B)$ is non-negative (212, 506), then a root of the function has been found and the bracketing process terminates. If not, then $$\rho_A = (1 + \eta) \times \rho_{frac}^{AI}$$

becomes the new left endpoint of the window and the right endpoint is extended to $$\rho_B = (1 + 2\eta) \times \rho_{frac}^{AI}(508). \ f_{fp}(\rho_B)$$

is now evaluated (510). If it is non-negative, then we know that a root must lie in the new window and the process terminates. If not, then $$\rho_A = (1 + 2\eta) \times \rho_{frac}^{AI}$$

becomes the new left endpoint of the window and a predetermined value, $\rho_{max}$, becomes the right endpoint, and the process terminates (512).

Figure 6:
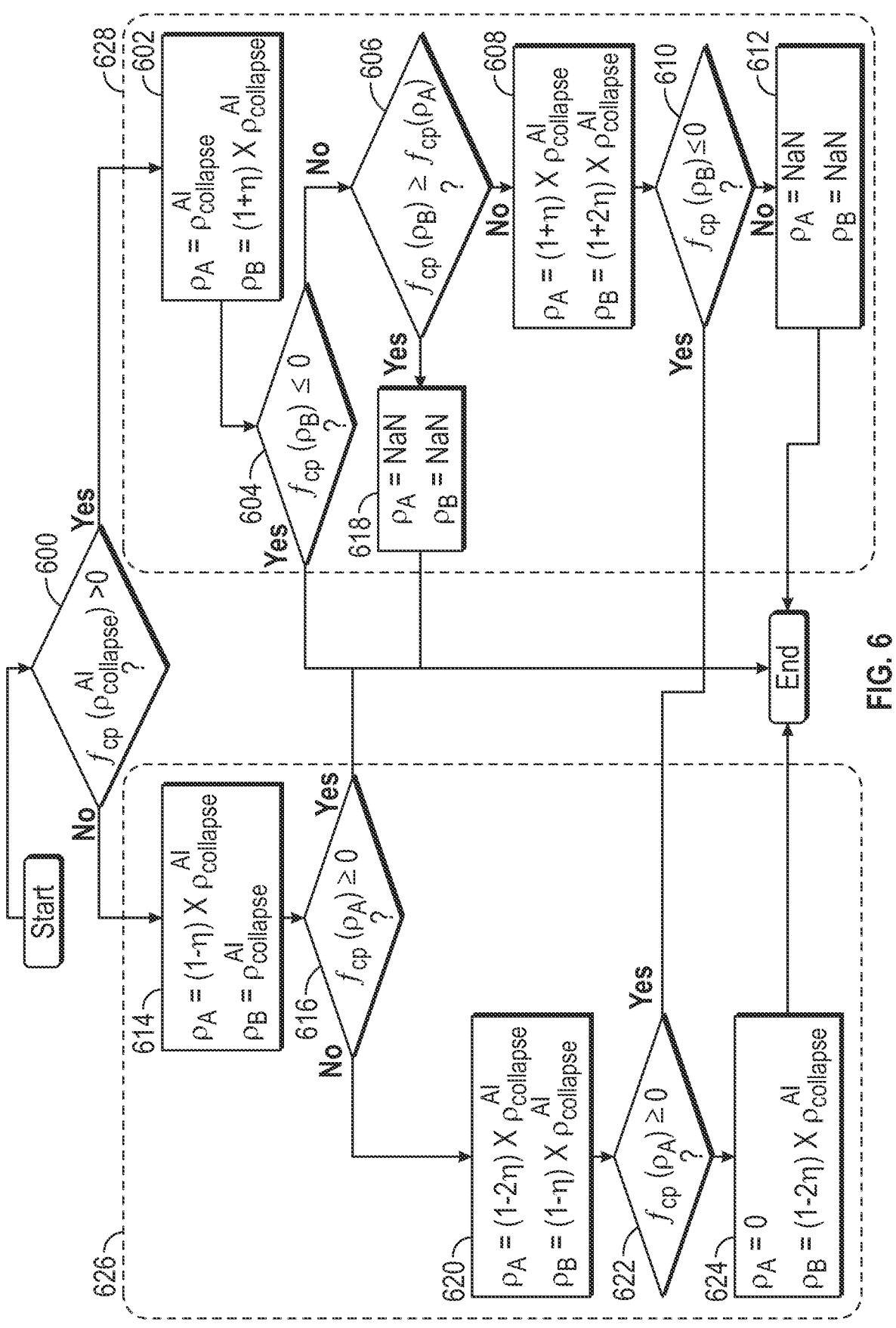
FIG. 6 shows a flowchart for defining a search window for the collapse mud weight, starting with the AI-predicted value.

In accordance with one or more embodiments, FIG. 6 shows a flowchart to determine a collapse mud weight search window around the physics-based collapse mud weight, $$\rho_{collapse}^{*}. \tag{306}$$

In situ stresses, physical and mechanical properties of subsurface rocks, and borehole geometry are required for physics-based collapse calculations, and are determined from the drilling operation or laboratory experiments prior to the first step in this flowchart. Physics-based theory predicts a V-shaped curve (310) for collapse failure potential, $f_{cp}$, versus mud weight that has two roots where the curve equals zero. The value of interest is associated with the first root. If $$f_{cp}\left(\rho_{collapse}^{AI}\right)$$

is greater than zero (308, 600), then $$\rho_{collapse}^{AI}$$

lies either to the left of the first root or to the right of the second root. This follows the right branch of the flowchart (628). Conversely, if $$f_{cp}\left(\rho_{collapse}^{AI}\right)$$

is less than or equal to zero (308, 600), then $$\rho_{collapse}^{AI}$$

lies within the two roots, and the root of interest lies to its left on the graph. In this case, the left branch of the flowchart (626) is followed.

Beginning with the left branch (626) at Step 614, in accordance with one or more embodiments, a first bound of a collapse mud weight search window, $\rho_B$, may be defined, where $$\rho_B = \rho_{collapse}^{AI}.$$

Further, a second bound of the collapse mud weight search window, $$\rho_A = (1 - \eta)\rho_{collapse}^{AI},$$

may be defined. In some embodiments, q is a factor that may be set to 0.1, signifying the collapse mud weight search window extends from 90% to 100% of the predicted AI collapse mud weight, $$\rho_{collapse}^{AI}.$$

In other embodiments, q may be set to a different value. If the value of $f_{cp}(\rho_A)$ is greater than or equal to zero (616), we know that a root lies in the window and the process stops. If not, the right end of the search window is now set to $$\rho_B = (1 - \eta) \times \rho_{collapse}^{AI}$$

and the left end is set to $$\rho_A = (1 - 2\eta) \times \rho_{collapse}^{AI}(620). \ f_{cp}(\rho_A)$$

is then evaluated. If it is greater than or equal to zero, a root must lie in the window and the process stops (622). If not, the right end of the window is set to $$\rho_B = (1 - 2\eta) \times \rho_{collapse}^{AI}$$

and the left end of the window is set to $\rho_A=0$ (624). The root of the curve must lie in this window, so the process terminates.

Returning to the right branch of the flowchart (628), the search window is initially set with $$\rho_A = \rho_{collapse}^{AI}$$

as its left bound (308) and with $$\rho_B = (1 + \eta) \times \rho_{collapse}^{AI}$$

as its right bound (312, 602). In the next box on the right branch of the flowchart the collapse failure potential of the new end point of the window, $\rho_B$, is evaluated (604). If $f_{cp}(\rho_B)$ is non-negative, then it is compared to $f_{cp}(\rho_A)$. If $f_{cp}(\rho_A)-f_{cp}(\rho_B)$ (606), then it proves that the window is to the right of the rightmost root. In this case, the process is aborted (618) since the search window cannot contain the true $\rho_{collapse}^*$. If $f_{cp}(\rho_A)>f_{cp}(\rho_B)$, then the search window must be to the left of the leftmost root. In that case, $$\rho_A = (1 + \eta) \times \rho_{collapse}^{AI}$$

becomes the new left endpoint of the window and the right endpoint is extended to $$\rho_B = (1 + 2\eta) \times \rho_{collapse}^{AI}(608). \ f_{cp}(\rho_B)$$

is now evaluated (610). If it is negative, then we know that a root must lie in the new window. If not, then the true value of $\rho_{collapse}^*$ is assumed to be out of the range and the process is terminated (612).

FIG. 7 shows the workflow of the mud-weight window calculation process. First, an AI method is trained on pairs of borehole-formation configurations and their corresponding fracture and collapse mud weights (700). This involves sampling values of several input parameters for a borehole-formation configuration randomly within a realistic range, and then using physics-based calculations to produce the fracture mud weight and the collapse mud weight as output. After learning a mapping between the input and output parameters, the AI method is used on a new borehole-formation configuration to predict its AI fracture and AI collapse mud weights (702). Next, search windows are constructed around the AI fracture mud weight and the AI collapse mud weights (704). The search windows are refined to ensure that the true physics-based fracture mud weight and physics-based collapse mud weight are within the respective search windows. Following this, a root finding method used to calculate the physics-based fracture mud weight and the physics-based collapse mud weight within the respective search windows (706). Finally, the resulting values for the fracture mud weight and the collapse mud weight define a window of safe mud weights to use in a real borehole drilling operation, given its borehole-formation configuration (708).

Figure 8:
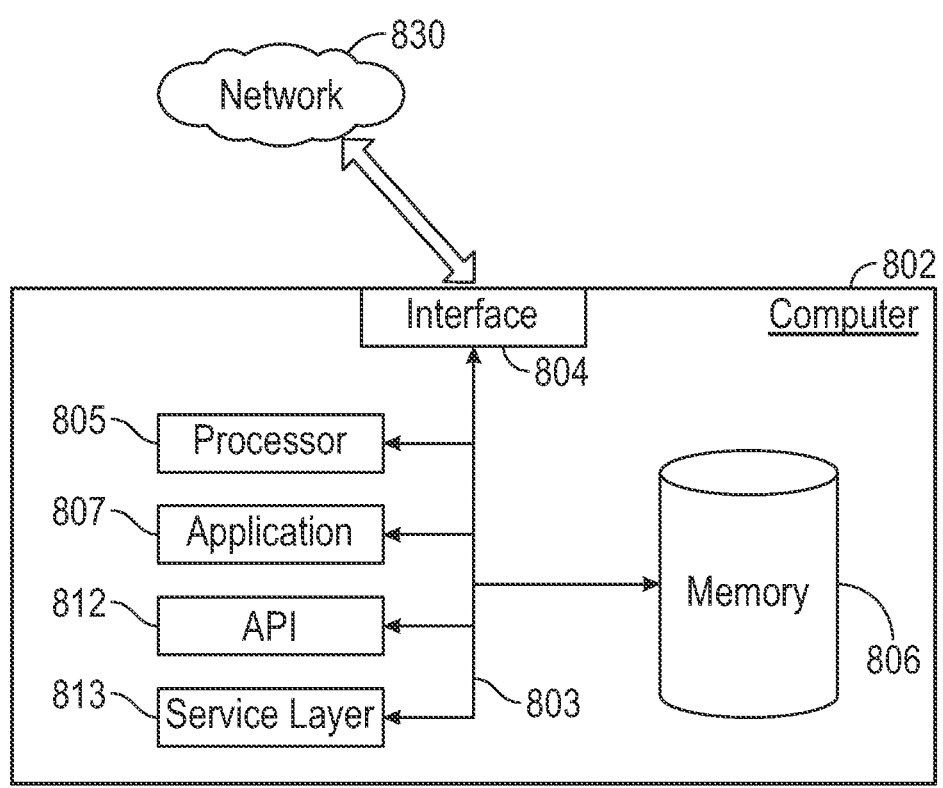
FIG. 8 shows a computer system in accordance with one or more embodiments.

FIG. 8 depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 2, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for determining a mud-weight window, comprising:

determining, using a computer processor, for each of a plurality of borehole-formation training models, a fracture mud weight using a first physics-based method and a collapse mud weight using a second physics-based method;

training, using the computer processor and the plurality of borehole-formation training models, an artificial intelligence (AI) network to predict the fracture mud weight and the collapse mud weight for a borehole-formation model;

determining, using the computer processor and the trained AI network, an AI fracture mud weight and an AI collapse mud weight from an observed borehole-formation model;

determining, using the computer processor, a fracture search window surrounding the AI fracture mud weight and a collapse search window surrounding the AI collapse mud weight;

predicting, using the computer processor, a final fracture mud weight within the fracture search window using the first physics-based method and a final collapse mud weight within the collapse search window using the second physics-based method; and determining the mud-weight window bounded by the final fracture mud weight and the final collapse mud weight, wherein the determining the fracture search window comprises:

determining a first fracture potential for the AI fracture mud weight using a physics-based method, determining a fracture search window extent based on a first predetermined percentage of the AI fracture mud weight, setting a first bound of the fracture search window equal to the AI fracture mud weight, and setting a second bound of the fracture search window equal to the AI fracture mud weight minus a product of a sign of the first fracture potential and the fracture search window extent.

2. The method of claim 1, further comprising:

mixing a mud with a mud-weight within the mud-weight window by adding an amount of solid material with an amount of fluid; and drilling a borehole while pumping the mud through an interior channel of a drillstring and through at least one nozzle of a drill bit.

3. The method of claim 1, wherein each of the plurality of borehole-formation training models comprises at least one of a geometry, a stress and a mechanical strength parameter, a thermal parameter, and a chemoelectrical parameter.

4. The method of claim 1, wherein each physics-based method comprises an iterative physics-based simulation and a root-finding process.

5. The method of claim 1, wherein the training of the AI network comprises tuning at least one parameter of the AI network to minimize an error metric between an AI network predicted mud weight and a physics-based predicted mud weight for each of the plurality of borehole-formation training models.

6. The method of claim 1 where the first predetermined percentage is 10%.

7. The method of claim 1, wherein determining the collapse search window comprises:

determining a first collapse potential for the AI collapse mud weight using a physics-based method;

determining a collapse search window extent based on a second predetermined percentage of the AI collapse mud weight;

setting a first bound of the collapse search window equal to the AI collapse mud weight; and setting a second bound of the collapse search window equal to the AI collapse mud weight plus a product of a sign of the first collapse potential and the collapse search window extent.

8. The method of claim 7 where the second predetermined percentage is 10%.

9. A non-transitory computer readable medium storing instructions executable by a computer processor, the instructions comprising functionality for:

determining for each of a plurality of borehole-formation training models, a fracture mud weight using a first physics-based method and a collapse mud weight using a second physics-based method;

training, using the plurality of borehole-formation training models, an artificial intelligence (AI) network to predict the fracture mud weight and the collapse mud weight for a borehole-formation model;

determining, using the trained AI network, an AI fracture mud weight and an AI collapse mud weight from an observed borehole-formation model;

determining a fracture search window surrounding the AI fracture mud weight and a collapse search window surrounding the AI collapse mud weight;

predicting a final fracture mud weight within the fracture search window using the first physics-based method and a final collapse mud weight within the collapse search window using the second physics-based method; and determining the mud-weight window bounded by the final fracture mud weight and the final collapse mud weight, wherein the determining the fracture search window comprises:

determining a first fracture potential for the AI fracture mud weight using a physics-based method;

determining a fracture search window extent based on a first predetermined percentage of the AI fracture mud weight;

setting a first bound of the fracture search window equal to the AI fracture mud weight; and setting a second bound of the fracture search window equal to the AI fracture mud weight minus a product of a sign of the first fracture potential and the fracture search window extent.

10. The non-transitory computer readable medium of claim 9, wherein each of the plurality of borehole-formation training models comprise at least one of a geometry, a stress and a mechanical strength parameter, a thermal parameter, and a chemoelectrical parameter.

11. The non-transitory computer readable medium of claim 9, wherein each physics-based method comprises an iterative physics-based simulation and a root-finding process.

12. The non-transitory computer readable medium of claim 9, wherein the training of the AI network comprises tuning at least one parameter of the AI network to minimize an error metric between an AI network predicted mud weight and a physics-based predicted mud weight for each of the plurality of borehole-formation training models.

13. The non-transitory computer readable medium of claim 10 where the first predetermined percentage is 10%.

14. The non-transitory computer readable medium of claim 9, wherein determining the collapse search window comprises:

determining a first collapse potential for the AI collapse mud weight using a physics-based method;

determining a collapse search window extent based on a second predetermined percentage of the AI collapse mud weight;

setting a first bound of the collapse search window equal to the AI collapse mud weight; and setting a second bound of the collapse search window equal to the AI collapse mud weight plus a product of a sign of the first collapse potential and the collapse search window extent.

15. The non-transitory computer readable medium of claim 14 where the second predetermined percentage is 10%.

16. A system, comprising:

a computer processor configured to:

determine, for each of a plurality of borehole-formation training models, a fracture mud weight using a first physics-based method and a collapse mud weight using a second physics-based method, train, using the plurality of borehole-formation training models, an artificial intelligence (AI) network to predict the fracture mud weight and the collapse mud weight for a borehole-formation model, determine, using the trained AI network, an AI fracture mud weight and an AI collapse mud weight from an observed borehole-formation model, determine a fracture search window surrounding the AI fracture mud weight and a collapse search window surrounding the AI collapse mud weight, predict a final fracture mud weight within the fracture search window using the first physics-based method and a final collapse mud weight within the collapse search window using the second physics-based method, and determine the mud-weight window bounded by the final fracture mud weight and the final collapse mud weight; and a drilling system configured to:

mix a mud with a mud weight within the mud-weight window by adding an amount of solid material with an amount of fluid, and drill a borehole while pumping the mud through an interior channel of a drillstring and through at least one nozzle of a drill bit, wherein the determining the fracture search window comprises:

determining a first fracture potential for the AI fracture mud weight using a physics-based method;

determining a fracture search window extent based on a first predetermined percentage of the AI fracture mud weight;

setting a first bound of the fracture search window equal to the AI fracture mud weight; and setting a second bound of the fracture search window equal to the AI fracture mud weight minus a product of a sign of the first fracture potential and the fracture search window extent.

17. The system of claim 16, wherein determining the collapse search window comprises:

determining a first collapse potential for the AI collapse mud weight using a physics-based method;

determining a collapse search window extent based on a second predetermined percentage of the AI collapse mud weight;

setting a first bound of the collapse search window equal to the AI collapse mud weight; and setting a second bound of the collapse search window equal to the AI collapse mud weight plus a product of a sign of the first collapse potential and the collapse search window extent.

* * * * *